United States Patent
Jheng et al.

(10) Patent No.: US 8,019,323 B2
(45) Date of Patent: Sep. 13, 2011

(54) METHODS FOR HANDLING AN APPARATUS TERMINATED COMMUNICATION REQUEST AND COMMUNICATION APPARATUSES UTILIZING THE SAME

(75) Inventors: Yu-Syuan Jheng, Yilan County (TW); Chun-Ying Wu, Taipei County (TW); Ching-Hsiu Liang, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 481 days.

(21) Appl. No.: 12/328,844

(22) Filed: Dec. 5, 2008

(65) Prior Publication Data

US 2009/0291710 A1      Nov. 26, 2009

Related U.S. Application Data

(60) Provisional application No. 61/054,851, filed on May 21, 2008.

(51) Int. Cl.
*H04M 3/16* (2006.01)
*H04L 12/58* (2006.01)

(52) U.S. Cl. ........... 455/411; 455/412.1; 455/558
(58) Field of Classification Search ........... 455/411, 455/412.1, 558
See application file for complete search history.

(56) References Cited

U.S. PATENT DOCUMENTS

| | | | |
|---|---|---|---|
| 7,558,596 B2 * | 7/2009 | Nicolas et al. | 455/550.1 |
| 7,577,090 B2 * | 8/2009 | Xu et al. | 370/219 |
| 7,706,839 B2 * | 4/2010 | Ueno | 455/558 |
| 2008/0064443 A1 | 3/2008 | Shin | |

FOREIGN PATENT DOCUMENTS

| | | |
|---|---|---|
| CN | 1602084 | 3/2005 |
| CN | 1960550 A | 5/2007 |
| CN | 101141732 A | 3/2008 |

OTHER PUBLICATIONS

English abstract of CN101141732A; pub. Mar. 12, 2008.
English abstract of CN1960550A; pub. May 9, 2007.
"3rd Generation Partnership Project: Technical Specification Group Core Network; Call Deflection (CD) Supplementary Service; Stage 3 (Release 7)" 3GPP TA 24.072 V7.0.0 (Jun. 2007).
"3rd Generation Partnership Project: Technical Specification Group Core Network; Call Deflection (CD) Supplementary Services; Stage 3 (Release 7)" 3GPP TS 24.082 V7.1.0 (Sep. 2007).
English language translation of abstract of CN 1602084 (published Mar. 30, 2005).

* cited by examiner

*Primary Examiner* — Kenneth B. Wells
(74) *Attorney, Agent, or Firm* — Thomas|Kayden

(57) ABSTRACT

A communication apparatus is provided. A first subscriber identity card is with a first address and camps on a first cell. A second subscriber identity card is with a second address and camps on a second cell. A processor determines whether a first communication status of the first subscriber identity card reaches a first limitation, determines whether a second communication status of the second subscriber identity card reaches a second limitation, and determines whether to activate a service instructing the first wireless network to transfer a first apparatus terminated communication request of the first subscriber identity card to the second subscriber identity card according to determination results for the first communication status and the second communication status, wherein the first apparatus terminated communication request is initiated from a peer communication entity to request for establishing wireless communication with the first subscriber identity card.

20 Claims, 14 Drawing Sheets

METHODS FOR HANDLING AN APPARATUS TERMINATED COMMUNICATION REQUEST AND COMMUNICATION APPARATUSES UTILIZING THE SAME

CROSS REFERENCE TO RELATED APPLICATIONS

This application claims the benefit of U.S. Provisional Application No. 61/054,851 filed May 21, 2008, and entitled "Systems and Methods for Handling Conference Calls and Incoming Calls With Two or More (U)SIM Cards", the entire contents of which are hereby incorporated by reference.

BACKGROUND OF THE INVENTION

1. Field of the Invention

The invention relates to a method for handling an apparatus terminated communication request in a communication apparatus, and more particularly to a method for handling an apparatus terminated communication request in the communication apparatus with increased communication capability.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and -defined cellular communication technologies. For example, the Global System for Mobile communications (GSM) communication system is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS communication system (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network.

With the advanced development of wireless communication technologies, it is now possible to provide multiple wireless communication services using different or the same communication technologies in one communication apparatus. In order to increase the communication capability, methods for handling an apparatus terminated communication request in the communication apparatus with increased communication capability are highly required.

BRIEF SUMMARY OF THE INVENTION

Communication apparatuses and methods for handing an apparatus terminated communication request in a communication apparatus with increased communication capability are provided. An embodiment of such a communication apparatus comprises a first radio transceiver module, a second radio transceiver module, a first subscriber identity card with a first address and camping on a first cell belonging to a first wireless network via the first radio transceiver module, a second subscriber identity card with a second address and camping on a second cell belonging to a second wireless network via the second radio transceiver module and a processor coupled to the first radio transceiver module, the second radio transceiver module, the first subscriber identity card and the second subscriber identity card. The processor determines whether a first communication status of the first subscriber identity card reaches a first limitation, determines whether a second communication status of the second subscriber identity card reaches a second limitation, and determines whether to activate a service instructing the first wireless network to transfer a first apparatus terminated communication request of the first subscriber identity card to the second subscriber identity card according to determination results for the first communication status and the second communication status, wherein the first apparatus terminated communication request is initiated from a peer communication entity to request for establishing wireless communication with the first subscriber identity card.

Another embodiment of a method for handing an apparatus terminated communication request in a communication apparatus with increased communication capability is provided. The communication apparatus comprises a first radio transceiver module, a second radio transceiver module, a first subscriber identity card with a first address and camping on a first cell belonging to a first wireless network via the first radio transceiver module, a second subscriber identity card with a second address and camping on a second cell belonging to a second wireless network via the second radio transceiver module and a processor coupled to the first radio transceiver module, the second radio transceiver module, the first subscriber identity card and the second subscriber identity card. The method comprises: determining whether a first communication status of the first subscriber identity card reaches a first limitation; determining whether a second communication status of the second subscriber identity card reaches a second limitation; and when the first communication status reaches the first limitation and the second communication status does not reach the second limitation, transmitting a transfer request from the first subscriber identity card to the first cell to request the first wireless network to transfer a first apparatus terminated communication request of the first subscriber identity card to the second subscriber identity card, wherein the first apparatus terminated communication request is initiated from a peer communication entity to request for establishing wireless communication with the first subscriber identity card.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
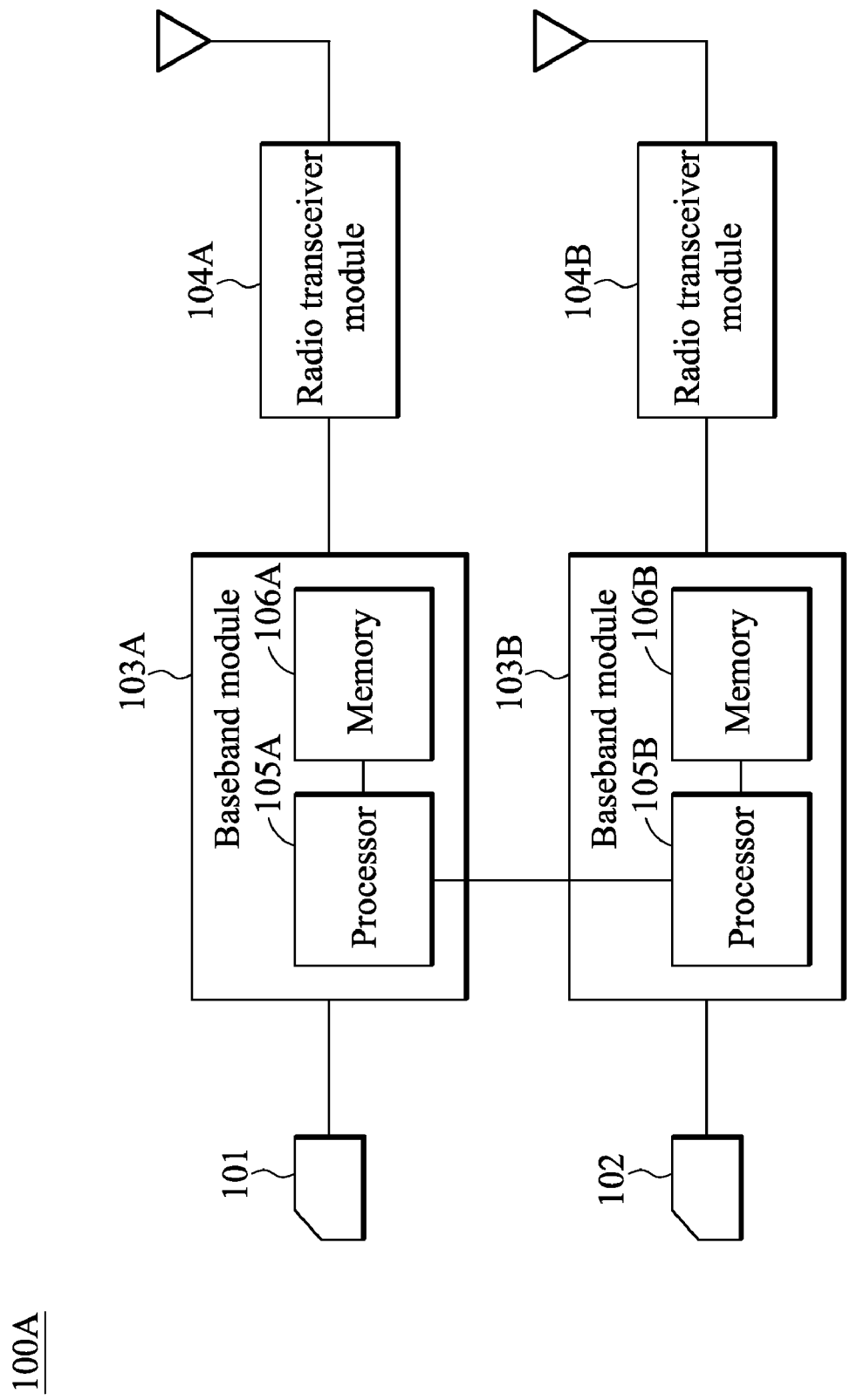
FIG. 1 shows a communication apparatus according to an embodiment of the invention.

FIG. 1 shows a communication apparatus capable of handling an apparatus terminated communication request with increased communication capability according to an embodiment of the invention. As shown in FIG. 1, a communication apparatus 100A comprises subscriber identity cards 101 and 102 plugged into two sockets, baseband modules 103A and 103B, and radio transceiver modules 104A and 104B, wherein the baseband module 103A is coupled to the subscriber identity card 101 and the radio transceiver module 104A, and the baseband module 103B is coupled to the subscriber identity card 102 and the radio transceiver module 104B. The radio transceiver modules 104A and 104B receive wireless radio frequency signals, and convert the received signals to baseband signals to be processed by the baseband modules 103A and 103B, respectively, or receive baseband signals respectively from the baseband modules 103A and 103B and convert the received signals to wireless radio frequency signals to be transmitted to a peer device. The radio transceiver modules 104A or 104B may comprise a plurality of hardware devices to perform radio frequency conversion. For example, the radio transceiver module 104A or 104B may comprise a mixer to multiply the baseband signals with a carrier oscillated in the radio frequency of the wireless communication system, wherein the radio frequency may be, for example, 900 MHz or 1800 MHz for a global system for mobile communication (GSM) communication system, or 1900 MHz for a Universal Mobile Telecommunications System (UMTS) communication system, or others. The baseband modules 103A and 103B further respectively convert the baseband signals to a plurality of digital signals, and process the digital signals, and vice versa. The baseband module 103A or 103B may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 103A comprises a memory device 106A and a processor 105A for controlling the operations of the subscriber identity card 101, remaining parts of the baseband module 103A, and the radio transceiver module 104A, and the baseband module 103B also comprises a memory device 106B and a processor 105B for controlling the operations of the subscriber identity card 102, remaining parts of the baseband module 103B, and the radio transceiver module 104B. The processors 105A and 105B may be coupled and communicate with each other. The data stored in memory devices 106A and 106B may be shared and accessed by both of the processors 105A and 105B. For example, one of the processor may be a master processor and the other one may be a slave processor cooperatively operated. The processors 105A and 105B respectively read data from the plugged subscriber identity cards 101 and 102 and writes data thereto. It is to be noted that the memory devices 106A and 106B may also be configured outside of the baseband modules 103A and 103B and the invention should not be limited thereto.

Figure 2:
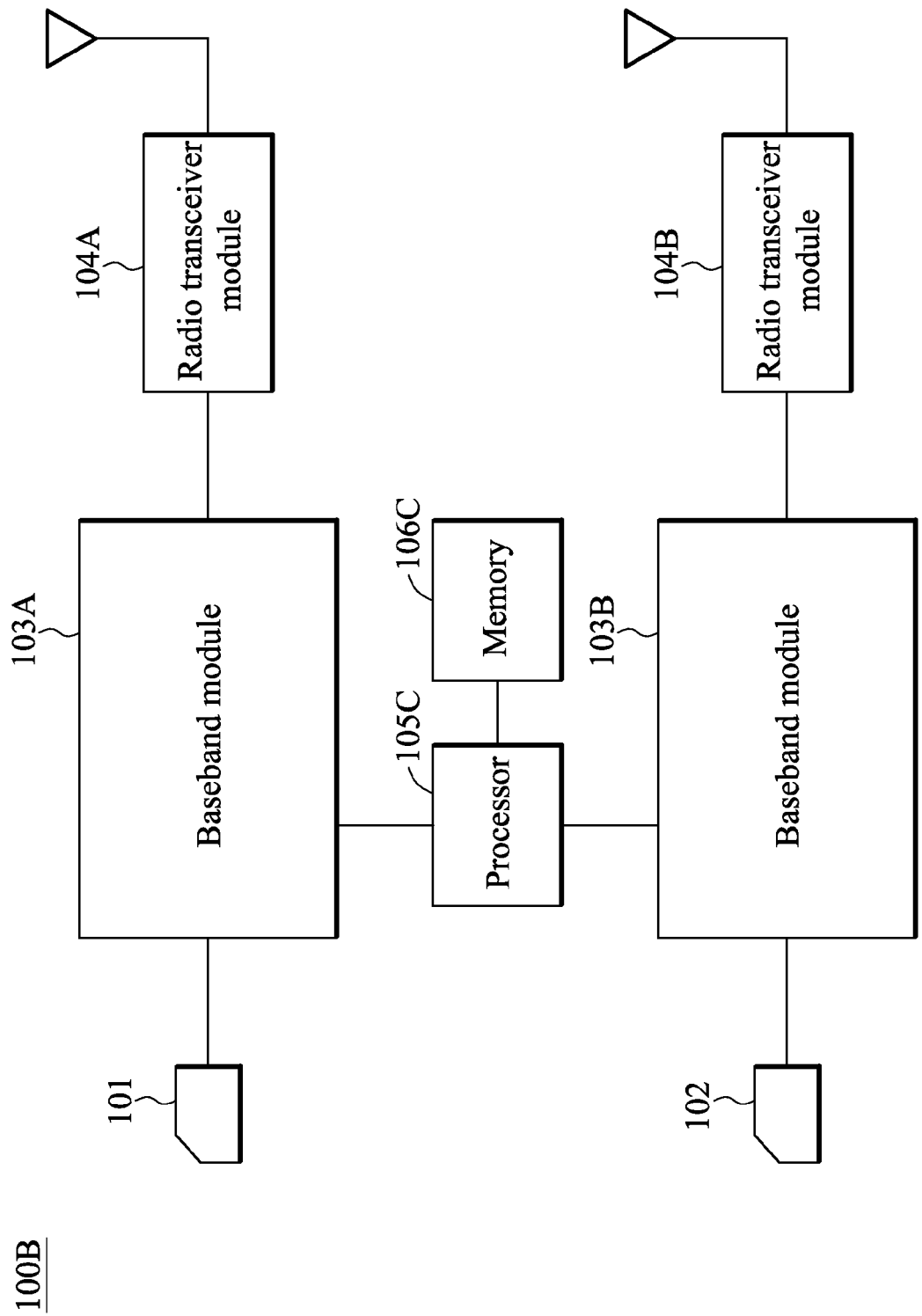
FIG. 2 shows a communication apparatus according to another embodiment of the invention.

FIG. 2 shows a communication apparatus according to another embodiment of the invention. As shown in FIG. 2, the communication apparatus 100B may comprise one memory device 106C and one processor 105C for controlling the operations of the subscriber identity cards 101 and 102, the baseband modules 103A and 103B, and the radio transceiver modules 104A and 104B. The operations of the processor 105C are similar with that of the processors 105A or 105B and are not described here for brevity. The described processors 105A, 105B and 105C may be general-purposed processors and execute program code performing control operations to be mentioned below. The described memory devices 106A, 106B and 106C may comprise at least one of read only memory (ROM), random access memory (RAM), NOR flash and NAND flash for storing program code and data.

Figure 3:
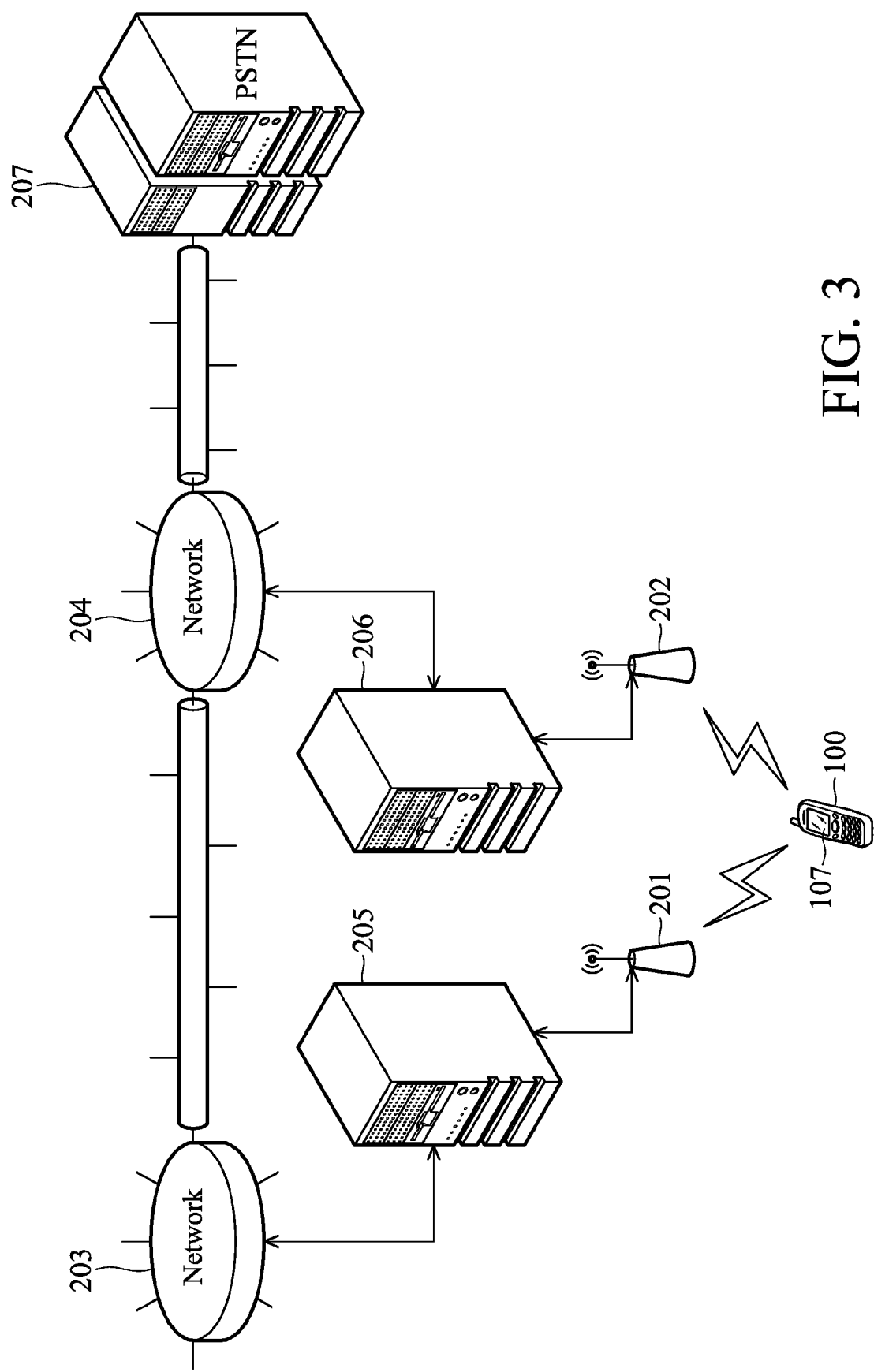
FIG. 3 shows an exemplary network topology according to an embodiment of the invention.

FIG. 3 shows a network topology according to an embodiment of the invention. The communication apparatus 100 shown in FIG. 3, may be one of the communication apparatuses 100A, and 100B previously described in FIG. 1 and FIG. 2. Thus, from hereinafter, the communication apparatus 100 will be used to represent all like previously described apparatuses for brevity. The communication apparatus 100, equipped with more than one subscriber identity card, may simultaneously access networks 203 and 204 of the same or different communication technologies, where the network 203 or 204 may be the GSM communication system, WCDMA, Wi-Fi, CDMA2000 or Time Division-Synchronous Code Division Multiple Access (TD-SCDMA) network, or Internet, or the like, after camping on or associating with the cells managed by access stations 201 and 202, where the access station 201 or 202 may be a base station, a node-B, an access point compatible with 802.11a, 802.11b or 802.11g. The communication apparatus 100 may issue an apparatus originated communication request, also referred to as mobile originated (MO) call request, such as a voice call, a data call, a video call, or a voice over Internet Protocol (VOIP) call, to a called party (i.e. a destination peer communication entity with a destination address of another wired or wireless communication apparatus) through at least one of the networks 203 and 204 with corresponding network control center 205 and 206 (for example, the GSM communication system network with a Base Station Controller (BSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. The address may be, as an example, a series of predetermined numbers directed to a specific subscriber identity card, such as an Internet Protocol (IP) address for a VOIP call or a phone number for a circuit switch call, or others. Moreover, the communication apparatus 100 may receive an apparatus terminated communication request, also referred to as mobile terminated (MT) call request, such as an incoming voice call, an incoming data call, an incoming video call, or an incoming voice over Internet Protocol (VOIP) call with any of the subscriber identity cards from a calling party (i.e. an origination peer communication entity with an origination address of another wired or wireless communication apparatus). The apparatus terminated communication request is a communication request initiated from a peer communication entity to request to establish wireless communication with a subscriber identity card of the communication apparatus 100. It is to be understood that there may be one or more gateways positioned between heterogeneous types of networks.

According to an embodiment of the invention, any of the subscriber identity cards 101 and 102 may relate to one type of wireless communication system. For example, the subscriber identity card 101 or 102 may be the subscriber identity module (SIM) card corresponding to the GSM communication system, or the universal subscriber identity module (USIM) card corresponding to the UMTS communication system, or the removable user identity module (RUIM) card or the CDMA Subscriber Identity Module (CSIM) card corresponding to the CDMA2000 communication system, or others. An SIM card typically contains user account information, an international mobile subscriber identity (IMSI) and a set of SIM application toolkit (SAT) commands and provides storage space for phone book contacts. The processor, such as 105A, 105B or 105C, of the baseband module, such as 103A or 103B, may interact with a micro control unit (MCU) of the SIM card to fetch data or SAT commands from the plugged SIM card. The communication apparatus 100 is immediately programmed after being plugged into the SIM card. The SIM card may also be programmed to display custom menus for personalized services. The communication apparatus 100 may be plugged into an USIM card for a UMTS (also called 3G) telephony communication. The USIM card stores user account information, IMSI, authentication information and a set of USIM Application Toolkit (USAT) commands and provides storage space for text messages and phone book contacts. The baseband processors 105A, 105B or 105C may interact with an MCU of the USIM card to fetch data or SAT commands from the plugged USIM card. The phone book on the USIM card is more enhanced than that on the SIM card. For authentication purposes, the USIM card may store a long-term preshared secret key K, which is shared with the Authentication Center (AuC) in the network. The USIM MCU may verify a sequence number, that may be within a range, by using a window mechanism to avoid replay attacks and generate the session keys CK and IK to be used in the confidentiality and integrity algorithms of the KASUMI (also termed A5/3) block cipher in the UMTS communication system. The communication apparatus 100 is immediately programmed after being plugged into the USIM card. The IMSI is a unique number associated with a global system for mobile communication (GSM) or a universal mobile telecommunications system (UMTS) network user. The IMSI may be sent by the communication apparatus 100 to the GSM or UMTS network to acquire other details of the mobile user in the Home Location Register (HLR) or, as locally copied, in the Visitor Location Register (VLR). An IMSI is typically 15 digits long, but can be shorter. The first 3 digits are the Mobile Country Code (MCC), and the following digits, are the Mobile Network Code (MNC), which are either 2 digits (European standard) or 3 digits (North American standard). The remaining digits are the mobile subscriber identification number (MSIN) for the GSM or UMTS network user.

Figure 4:
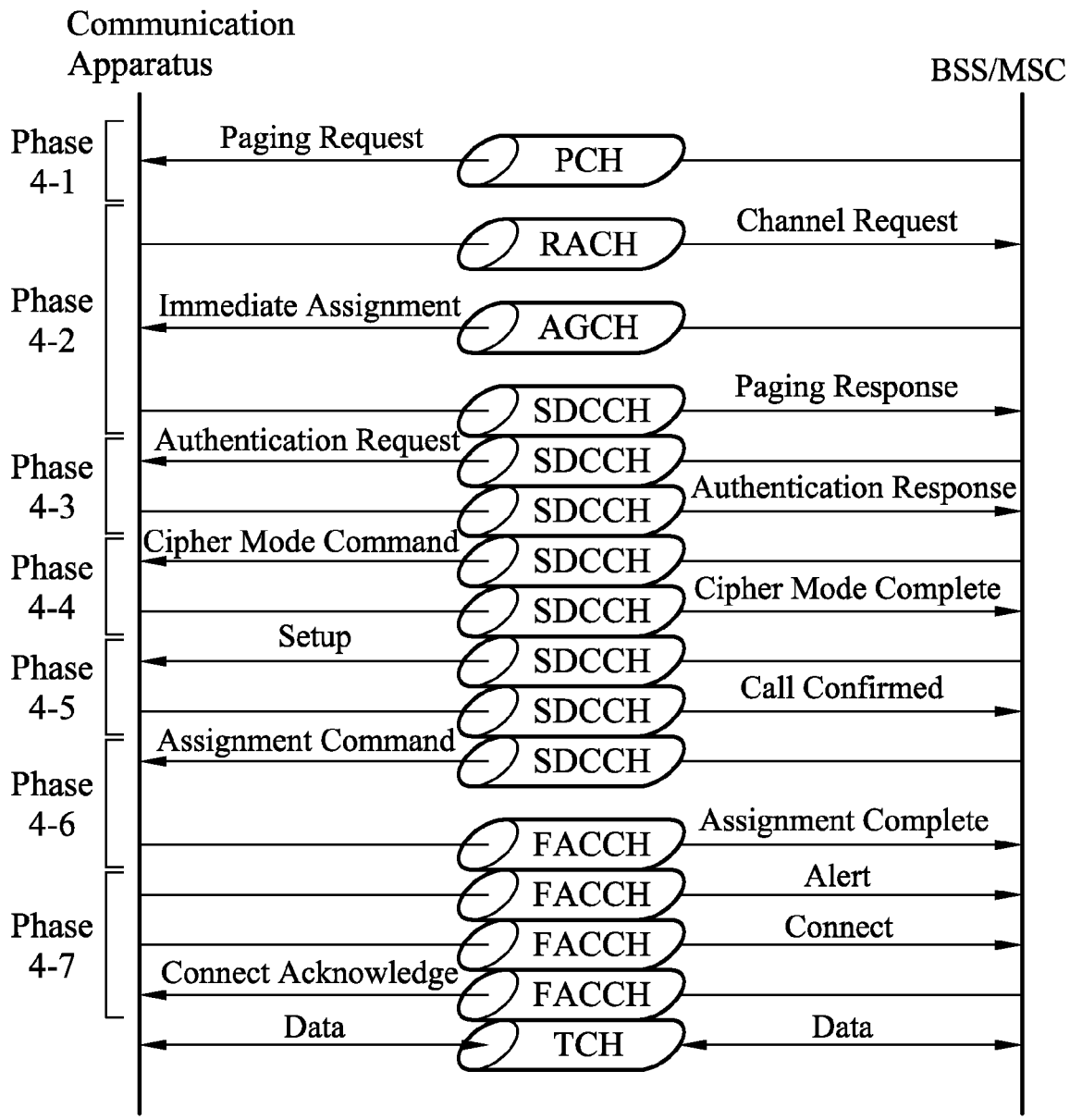
FIG. 4 shows logical channel assignments and signaling procedures of an apparatus terminated communication request in a GSM system.

FIG. 4 shows logical channel assignments and signaling procedures of an apparatus terminated communication request in a GSM system. When the communication apparatus 100 is being paged by a calling party, which means that the user of a peer wired or wireless communication apparatus is planning to originate a communication service with the communication apparatus 100, the Radio Resource (RR) entity first receives a Paging Request from the BSS/MSC via a Paging Channel (PCH) (Phase 4-1). The CC entity next requests a Mobility Management (MM) connection from the local MM entity via the Random Access Channel (RACH). The BSS in the wireless network may assign a Stand-alone Dedicated Control Channel (SDCCH) or a Traffic Channel (TCH) via an Immediate Assignment carried in the Access Grant Channel (AGCH), and the communication apparatus 100 responds with a Paging Response via the SDCCH to the BSS (Phase 4-2). After the process of authentication (Phase 4-3) and ciphering (Phase 4-4) with the MSC via the SDCCH is completed, an MM connection is established. After successful establishment of the MM connection and activation of the user data encryption, the CC entity is informed by a Setup message from MSC, and responds with a Call Confirmed message to the MSC (Phase 4-5). The communication apparatus 100 next receives an Assignment Command which indicates the allowance of assigning a dedicated channel (Phase 4-6), and the dedicated channel will be assigned after the communication apparatus 100 responds to an Assign Complete message, an Alert message, and a Connect message via a Fast Associated Control Channel (FACCH). As soon as the communication apparatus 100 receives the Connect Acknowledge message from the MSC (Phase 4-7), the dedicated channel is successfully established on the TCH and the communication apparatus 100, may now begin to communicate with the calling party. It is to be noted that the CC procedure of the WCDMA or TD-SCDMA communication system is similar to that of the GSM communication system and is not further described for brevity.

According to an embodiment of the invention, methods for handling an apparatus terminated communication request with increased communication capability in the communication apparatus, such as the communication apparatus 100A, 100B or 100 previously described, for a specific user communicating by using the communication apparatus 100, will be described in the following. The subscriber identity card 101 is with an address, hereinafter called $CN_A$ for brevity, and camps on a cell, hereinafter called $Cell_A$ for brevity, belonging to a wireless network, hereinafter called $NW_A$ for brevity, via the radio transceiver modules 104A. Similarly, the subscriber identity card 102 is with an address, hereinafter called $CN_B$ for brevity, and camps on a cell, hereinafter called $Cell_B$ for brevity, belonging to a wireless network, hereinafter called $NW_B$ for brevity, via the radio transceiver modules 104B. It is to be noted that $Cell_A$ and $Cell_B$ may be the same or different cells belonging to the same or different wireless networks $NW_A$ and $NW_B$ of the same or different communication technologies, and the invention should not be limited thereto.

According to the embodiment of the invention, in order to increase the communication capability of the communication apparatus 100, a processor, such as 105A, 105B or 105C, determines whether a first communication status of $CN_A$ has reached a first limitation, determines whether a second communication status of $CN_B$ has reached a second limitation, and when the first communication status reaches the first limitation and the second communication status does not reach the second limitation, transmits a transfer request from $CN_A$ to the cell $Cell_A$ to request the wireless network $NW_A$ to transfer an apparatus terminated communication request, which is originally transmitted to $CN_A$, to $CN_B$.

Figure 5A:
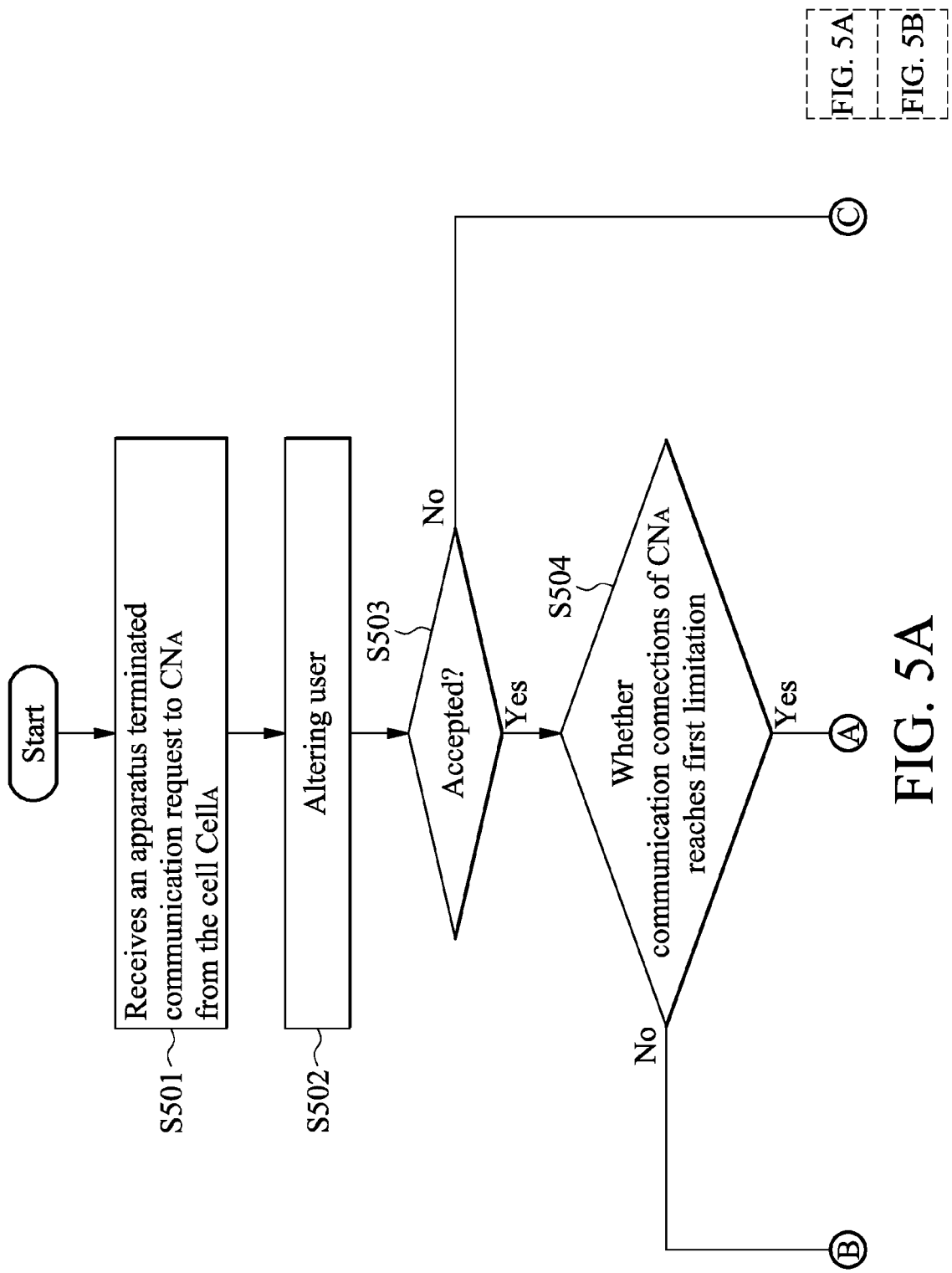
FIG. 5A and FIG. 5B show a flow chart of the method for handling an apparatus terminated communication request in the communication apparatus with increased communication capability according to an embodiment of the invention.
Figure 5B:
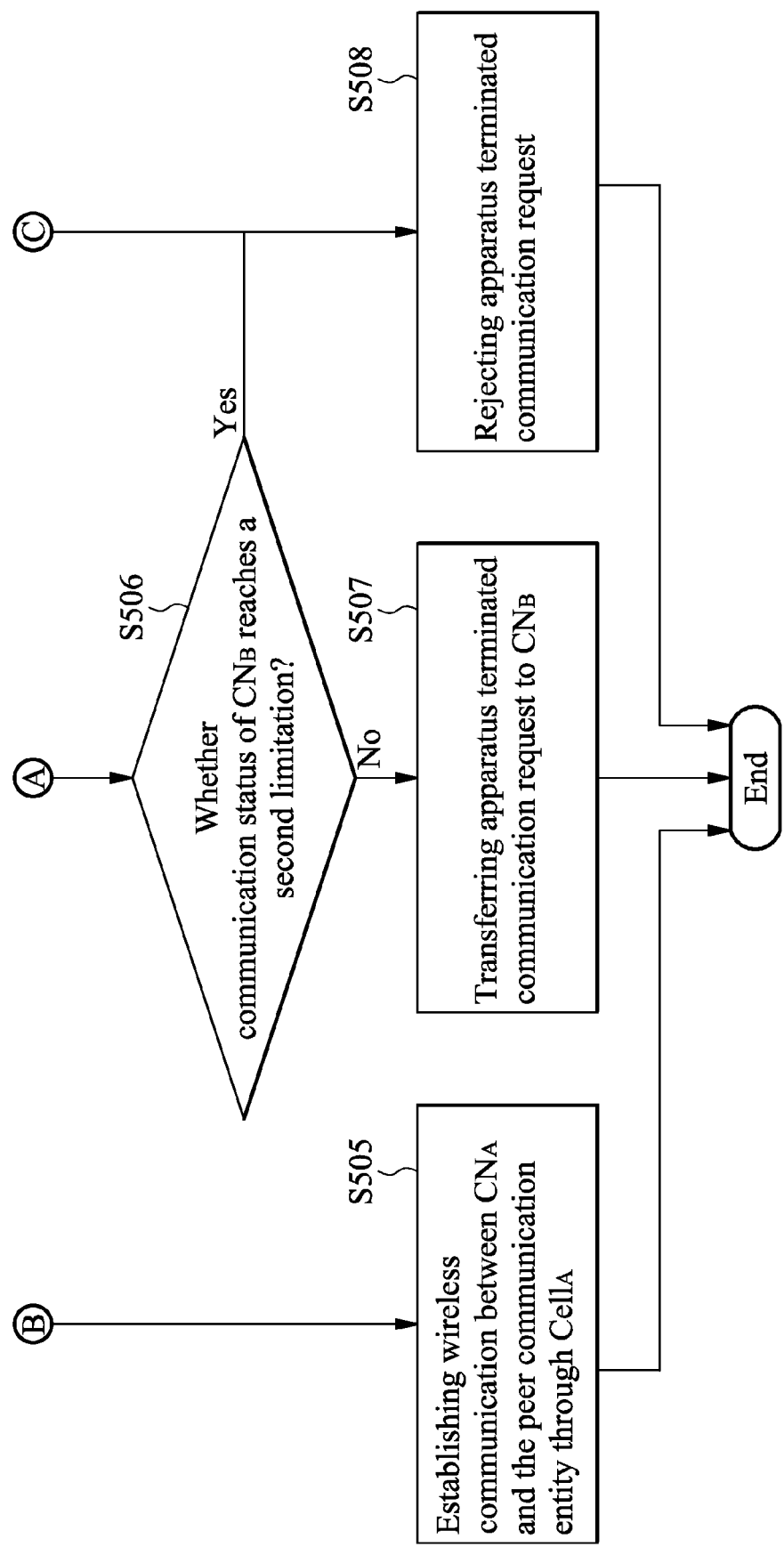

FIG. 5A and FIG. 5B show a flow chart of the method for handling an apparatus terminated communication request in the communication apparatus with increased communication capability according to an embodiment of the invention. The embodiment begins when the processor receives an apparatus terminated communication request initiated from a peer communication entity to request to establish wireless communication with one subscriber identity card of the communication apparatus 100 from the corresponding cell. As an example, the processor 105 receives an apparatus terminated communication request to $CN_A$ from the cell $Cell_A$ (Step S501). Next, the processor 105 alerts the user via a man-machine interface (MMI) (Step S502). The MMI may comprise screen menus and icons, command language and online help displayed on a display, as the display 107, shown in FIG. 3, of the communication apparatus 100 with at least one input device of a touch panel, physical keys on a key pad, buttons, dragging jogs and the similar. By using input devices of the MMI, users may manually touch, press, click, rotate or move the input devices to operate the communication apparatus 100. By manipulating the MMI, the user may decide whether to accept the apparatus terminated communication request. The processor determines whether the apparatus terminated communication request has been accepted via the received response from the MMI. When the processor receives an answer indication message to indicate the acceptance of the apparatus terminated communication request, the processor further determines whether the current communication connections of $CN_A$, also referred to as a first communication status of $CN_A$, reaches a first limitation (Step S504). According to the embodiment of the invention, the first communication status indicates a total number of active and held calls (including MT and MO calls) currently maintained by $CN_A$, and the first limitation indicates a total number of active and held calls which can be supported by $NW_A$. The first limitation may be defined depending on system requirements. As an example, $NW_A$ may only support at most one active voice/data call and one held voice call simultaneously. Or, $NW_A$ may only support at most one video call.

When the first communication status of $CN_A$ does not reach the first limitation, the processor establishes wireless communication between $CN_A$ and the peer communication entity through $Cell_A$ by replying with a CONNECT message to $NW_A$ to inform of the acceptance of the apparatus terminated communication request (Step S505). Alternatively, when the first communication status of $CN_A$ reaches the first limitation, the apparatus terminated communication request becomes a waiting communication request when the call waiting service is activated, and the wireless communication between $CN_A$ and the peer communication entity may not be successfully established until any one of the active and held calls of $CN_A$ is terminated. Thus, the processor further determines whether the second communication status of $CN_B$ reaches a second limitation (Step S506). Similarly, the second communication status indicates a total number of active and held calls (including MT and MO calls) currently maintained by $CN_B$, and the second limitation indicates a total number of active and held calls which can be supported by $NW_B$. The second limitation may be defined depending on system requirements. When the second communication status of $CN_B$ does not reach the second limitation, the processor transmits a transfer request from $CN_A$ to $Cell_A$ for requesting $NW_A$ to transfer the apparatus terminated communication request of $CN_A$ to $CN_B$ (Step S507). According to the embodiment of the invention, the transfer request may be a call deflection supplementary service (SS) request with a destination address of $CN_B$ so as to deflect the waiting apparatus terminated communication request to $CN_B$.

Figure 6:
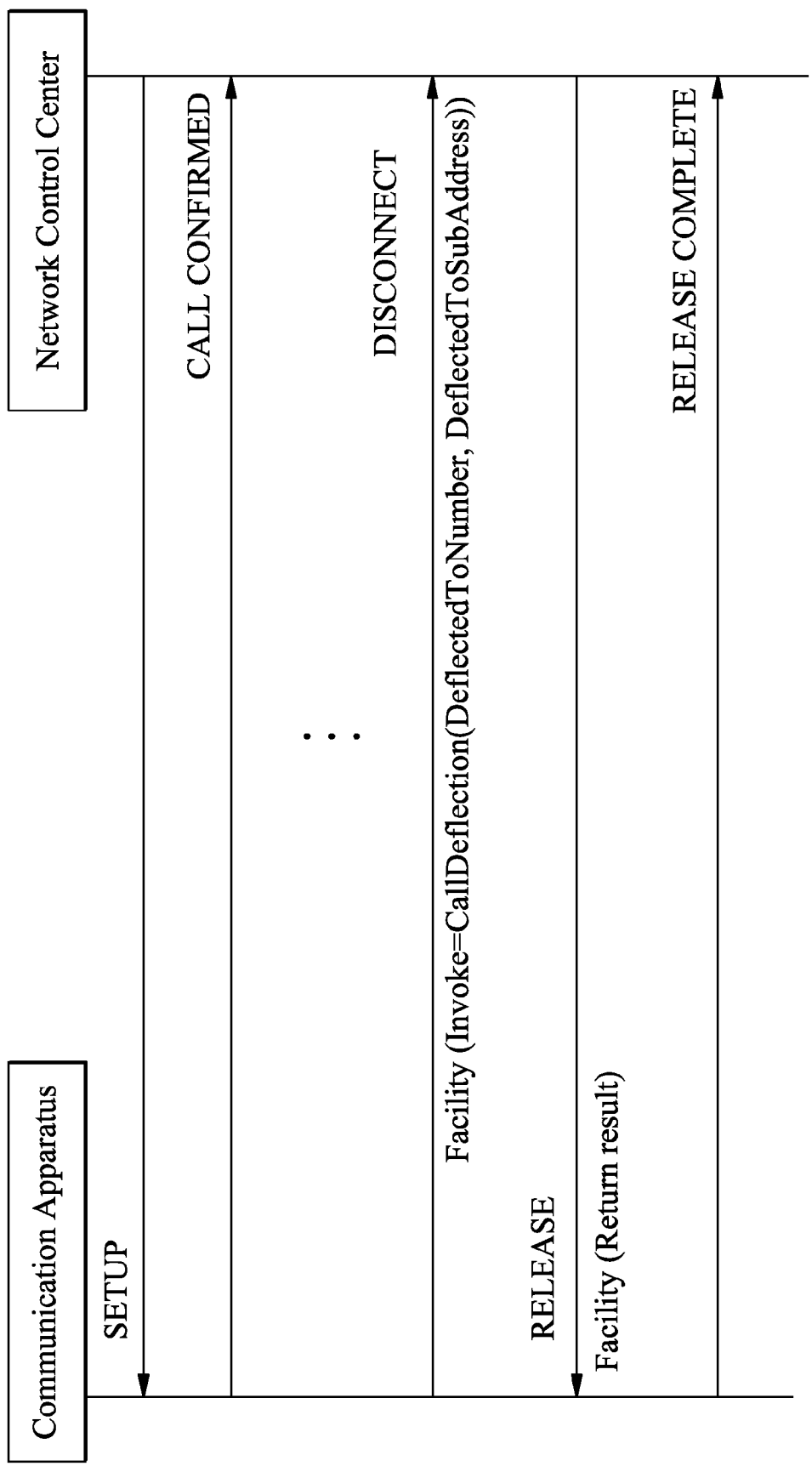
FIG. 6 shows the signaling procedures when implementing a call deflection supplementary service according to an embodiment of the invention.

FIG. 6 shows the signaling procedures when implementing a call deflection supplementary service according to an embodiment of the invention. The communication apparatus 100 may invoke the call deflection supplementary service when receiving an apparatus terminated communication request. The call deflection supplementary service may be implemented at every time after call confirmation and before the call is accepted. As shown in FIG. 6, the communication apparatus 100 invokes the call deflection supplementary service by initiating call clearing with a DISCONNECT message including a call deflection request. The call deflection request contains the DeflectedToNumber which may be accompanied by a DeflectedToSubAddress. The DISCONNECT message including the call deflection request contains the address corresponding to $CN_B$ to deflect the apparatus terminated communication request to $CN_B$. When the network control center, such as the MSC, accepts the call deflection request, the network control center continues call clearing. The result indication is returned to the communication apparatus 100 in the RELEASE message. Thus, after transmitting the transfer request, such as the call deflection supplementary service request, the processor may receive a release message indicating termination of procedures of establishing the wireless communication from $Cell_A$, and may further receive another apparatus terminated communication request of $CN_B$ from $Cell_B$. The originator of the newly received apparatus terminated communication request may indicate to the same peer communication entity with its origination address, and may further include the deflection information of $CN_A$. The processor may next establish the wireless communication between $CN_B$ and the peer communication entity through $Cell_B$. On the other hand, when the second communication status also reaches the second upper limit, or when the user decides not to accept the apparatus terminated communication request in step S503, the processor further transmits a reject request from $CN_A$ to $Cell_A$ to reject the apparatus terminated communication request (Step S508). The reject request may be a DISCONNECT message to inform of the rejection of the apparatus terminated communication request.

Figure 7:
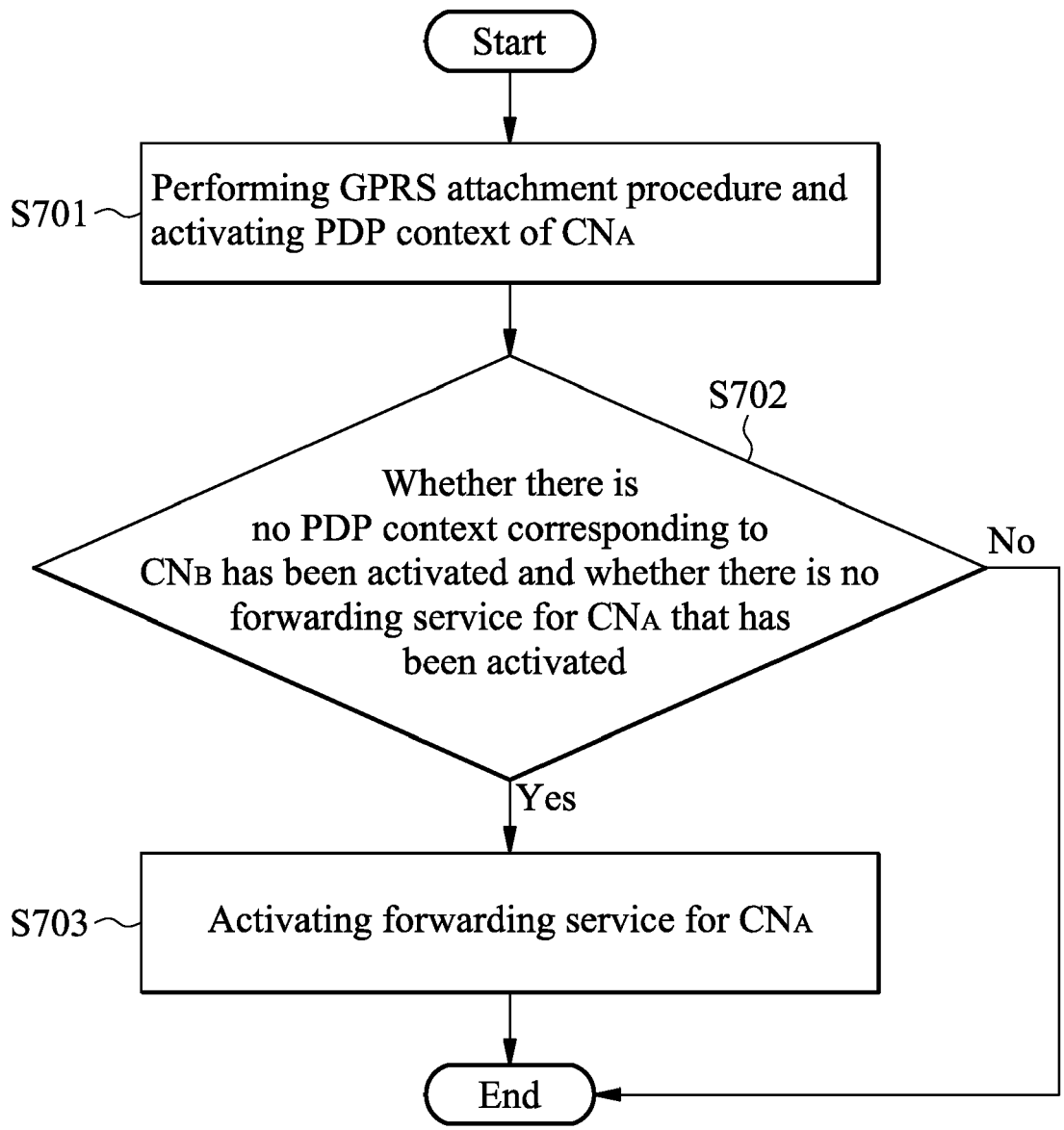
FIG. 7 shows a flow chart of the method for handling an apparatus terminated communication request in the communication apparatus with increased communication capability according to another embodiment of the invention.

FIG. 7 shows a flow chart of the method for handling an apparatus terminated communication request in the communication apparatus with increased communication capability according to another embodiment of the invention. The embodiment begins when the processor performs the General Packet Radio Service (GPRS) attachment procedure and creates and activates Packet Data Protocol (PDP) context for one of the subscriber identity cards of the communication apparatus 100, such as $CN_A$, through the corresponding cell (Step S701). In the embodiment, the first communication status indicates the current status of a forwarding service corresponding to $CN_A$, such as a Call Forwarding Unconditional (CFU) service, the first limitation indicates that no forwarding service corresponding to $CN_A$ has been activated, the second communication status indicates the current status of the PDP context corresponding to $CN_B$, and the second limitation indicates that an PDP context corresponding to $CN_B$ has been activated. The GPRS has been developed in a GSM, UMTS, CDMA2000 or TDS-CDMA network, or others. GPRS provides wireless access to packet data networks. Networks based on the Internet Protocol (IP) (e.g. the global Internet or private/corporate intranets) and X.25 networks are supported. Before using the GPRS service, the communication apparatus 100 attaches to the GPRS network (similar to the IMSI Attach used for circuit switched GSM services). An ATTACH REQUEST message is sent to a Serving GPRS Support Node (SGSN). The GPRS network then checks if the communication apparatus 100 is authorized, copies the user profile from the Home Location Register (HLR) to the SGSN, and assigns a Packet Temporary Mobile Subscriber Identity (P-TMSI) to the communication apparatus 100. The described procedure is called GPRS Attach. To exchange data packets with external Public Data Networks (PDNs) after a successful GPRS attach, the communication apparatus 100 applies for an address used in the PDN. The address is called a Packet Data Protocol (PDP) address. In the case where the PDN is an IP network, the PDP address is an IP address. For each session, a so-called PDP context is created, which describes the characteristics of the session. The PDP context describes PDP type (e.g. IPv4, IPv6 or others), the PDP address assigned to the communication apparatus 100, the requested Quality of Service (QoS) class and the address of a Gateway GPRS Support Node (GGSN) that serves as the access point to the external network.

Figure 8:
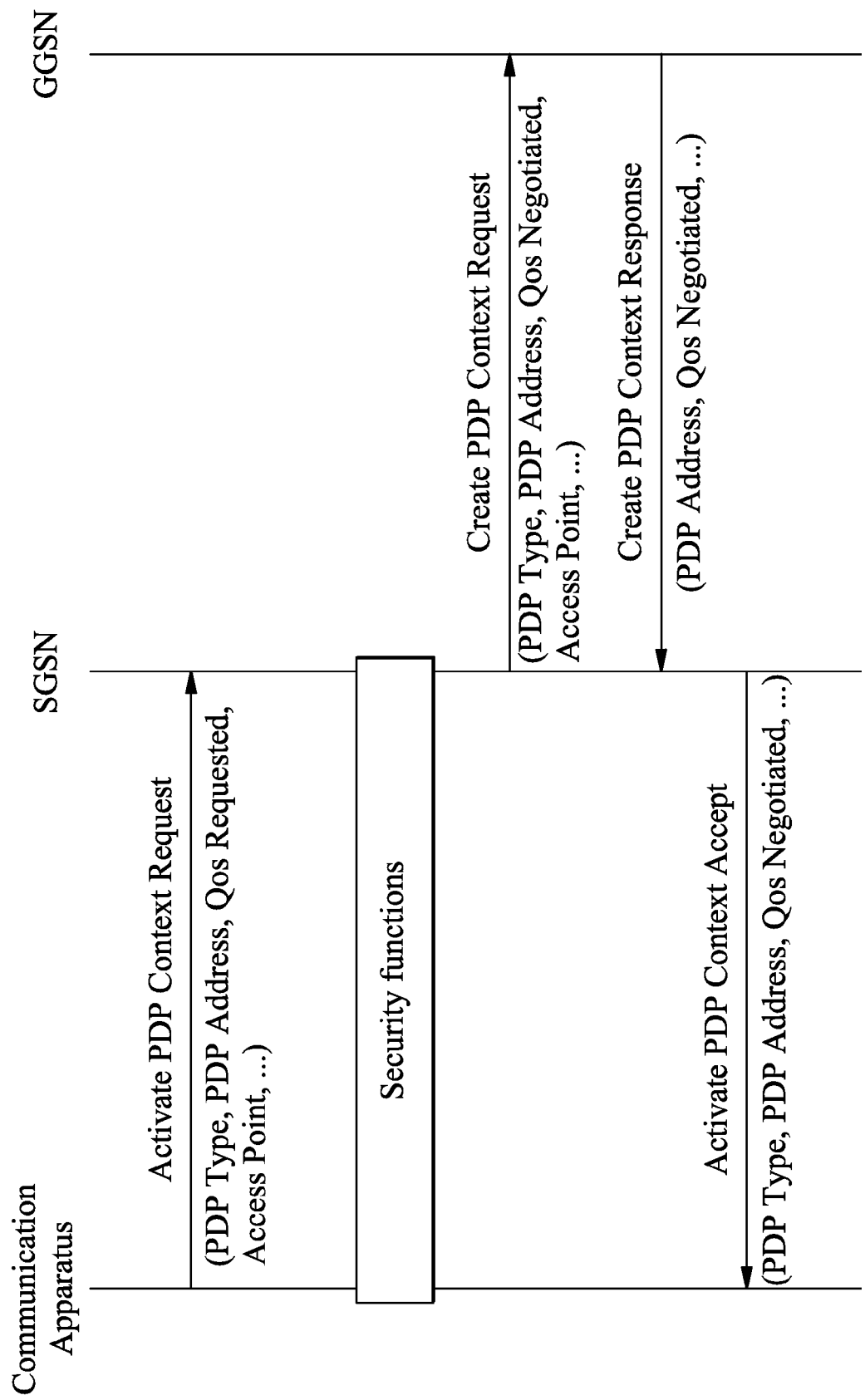
FIG. 8 shows the PDP context activation procedure initialized by the communication apparatus according to an embodiment of the invention.

FIG. 8 shows the PDP context activation procedure initialized by the communication apparatus 100 according to an embodiment of the invention. Using the message ACTIVATE PDP CONTEXT REQUEST, the communication apparatus 100 informs the SGSN of the requested PDP context. After that, the typical GSM, UMTS, CDMA2000 or TDS-CDMA security functions (e.g. authentication of the communication apparatus 100) are performed. If access is granted, the SGSN will send a CREATE PDP CONTEXT REQUEST to the affected GGSN. The GGSN creates a new entry in its PDP context table, which enables the GGSN to route data packets between the SGSN and the external PDN. The GGSN confirms the request to the SGSN with a message CREATE PDP CONTEXT RESPONSE. Finally, the SGSN updates its PDP context table and confirms the activation of the new PDP context to the communication apparatus 100 (ACTIVATE PDP CONTEXT ACCEPT). For the communication apparatus 100 using both circuit switched and packet switched services, it is possible to perform combined GPRS/IMSI attachment procedures. The disconnection from the GPRS network is called GPRS Detach, and can be initiated by the communication apparatus 100 or by the GPRS network.

After the processor receives the ACTIVATE PDP CONTEXT ACCEPT message as shown in FIG. 8, the PDP context is successfully activated and data packets can be exchanged through wireless network. The PDP context activation will maintain until PDP context deactivation or GPRS detach. The communication capability for a circuit-switched service or a packet-switched service may be limited when planning to use these two types of services simultaneously via a single subscriber identity card. As an example, for the GSM network, $CN_A$ can still establish a circuit-switched communication but the corresponding packet-switched communication is suspended when the PDP context corresponding to $CN_A$ has been activated. As another example, for the WCDMA network, when the PDP context corresponding to $CN_A$ has been activated, $CN_A$ may be able to establish another circuit-switched communication, however, the GPRS data throughput of the package-switched service may be downgraded. The communication apparatus 100 may create one or more PDP context sessions for accessing data from a PDN using the GPRS network that $CN_A$ has attached to. Referring back to FIG. 7, each time the PDP context session is created and activated, the processor further determines whether no PDP context corresponding to $CN_B$ has been activated and whether no forwarding service for $CN_A$ that has been activated, where activation of the forwarding service enables a corresponding wireless network to forward apparatus terminated communication requests of $CN_A$ to $CN_B$ (Step S702). According to the embodiment of the invention, when no PDP context corresponding to $CN_B$ has been activated and no forwarding service for $CN_A$ has been activated, the processor transmits a transfer request to activate the forwarding service for $CN_A$ so as to forward the possible apparatus terminated communication request of $CN_A$ to $CN_B$ during the period of the activated PDP context corresponding to $CN_A$ (Step S703). The activation of the forwarding service may be helpful to increase the transmission throughput with handling of the apparatus terminated communication request of $CN_A$ using $CN_B$. It is to be noted that when the processor transmits the transfer request, the GPRS traffic may be temporarily suspended because the circuit-switched service has higher priority than the packet-switched service. After the dedicated channel for transmitting the transfer request has been released, the network may determine whether the conditions for the GPRS suspension have disappeared and may automatically resume the GPRS service. The communication apparatus 100 may receives an RR Channel Release (Resume) message indicating whether the SGSN has successfully been requested to resume GPRS services. When the SGSN is unable to resume the GPRS services, the communication apparatus 100 may resume GPRS services by sending a Routing Area Update Request message to the SGSN.

According to an embodiment of the invention, the forwarding service may be a call forwarding related supplementary service (SS), such as a Call Forwarding Unconditional (CFU) supplementary service, with a destination address of $CN_B$ so as to instruct $NW_A$ to forward apparatus terminated communication requests of $CN_A$ to $CN_B$. The transfer request may be a supplementary service activation request to activate the call forwarding related supplementary service. When $CN_A$ activates the CFU service, all apparatus terminated communication requests will not be switched to $CN_A$, but forwarded to another. During registration and activation of the CFU service, a ForwardedToNumber which may be accompanied with a ForwardedToSubAddress, and information regarding all apparatus terminated communication requests or that of a specific basic service should be forwarded are to be registered in the network. The basic services contain various circuit-switched services. For example, the basic service may be a speech call service (TS_TELEPHONY=0x11), a data call or short message service (TS_SHORTMESSAGEMT_PP=0x21 or TS_SHORTMESSAGEMO_PP=0x22), a facsimile call service (TS_FACSIMILEGROUP3ANDALTERSPEECH=0x61) or others.

Figure 9:
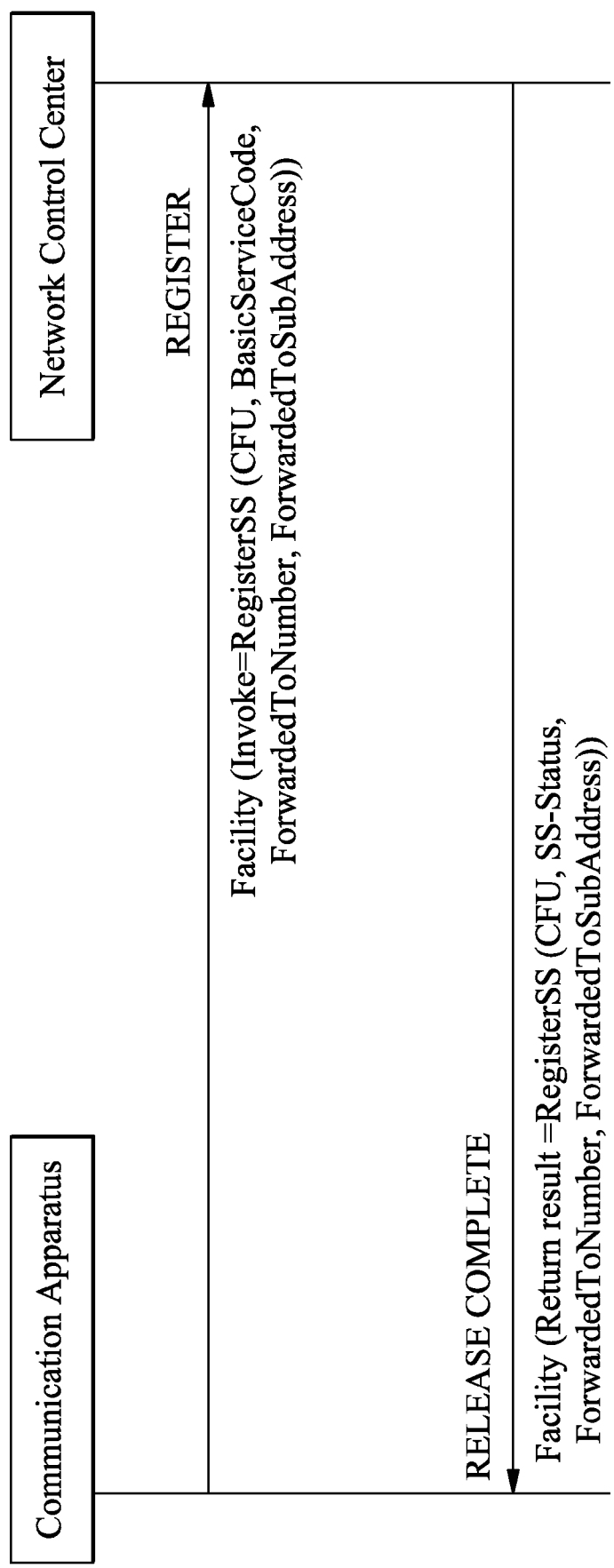
FIG. 9 shows the CFU registration procedure initialized by the communication apparatus according to an embodiment of the invention.
Figure 10:
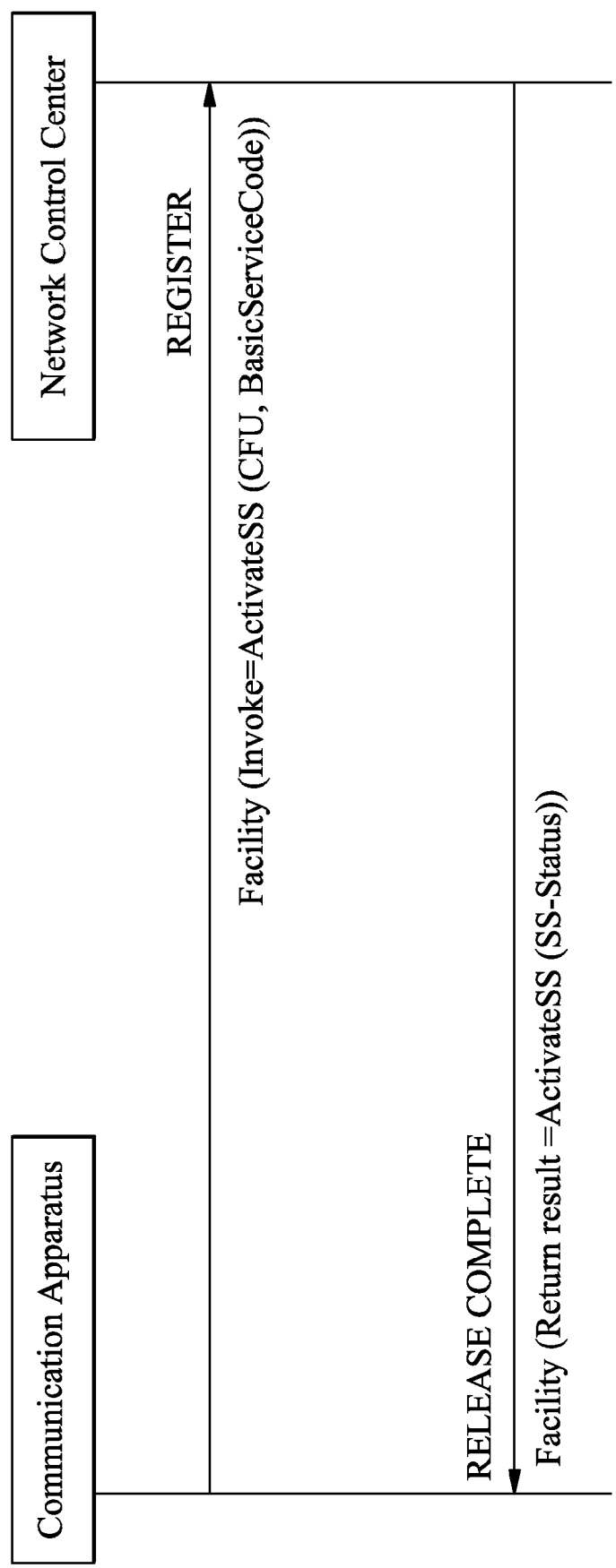
FIG. 10 shows an explicit CFU activation procedure initialized by the communication apparatus according to an embodiment of the invention.
Figure 11:
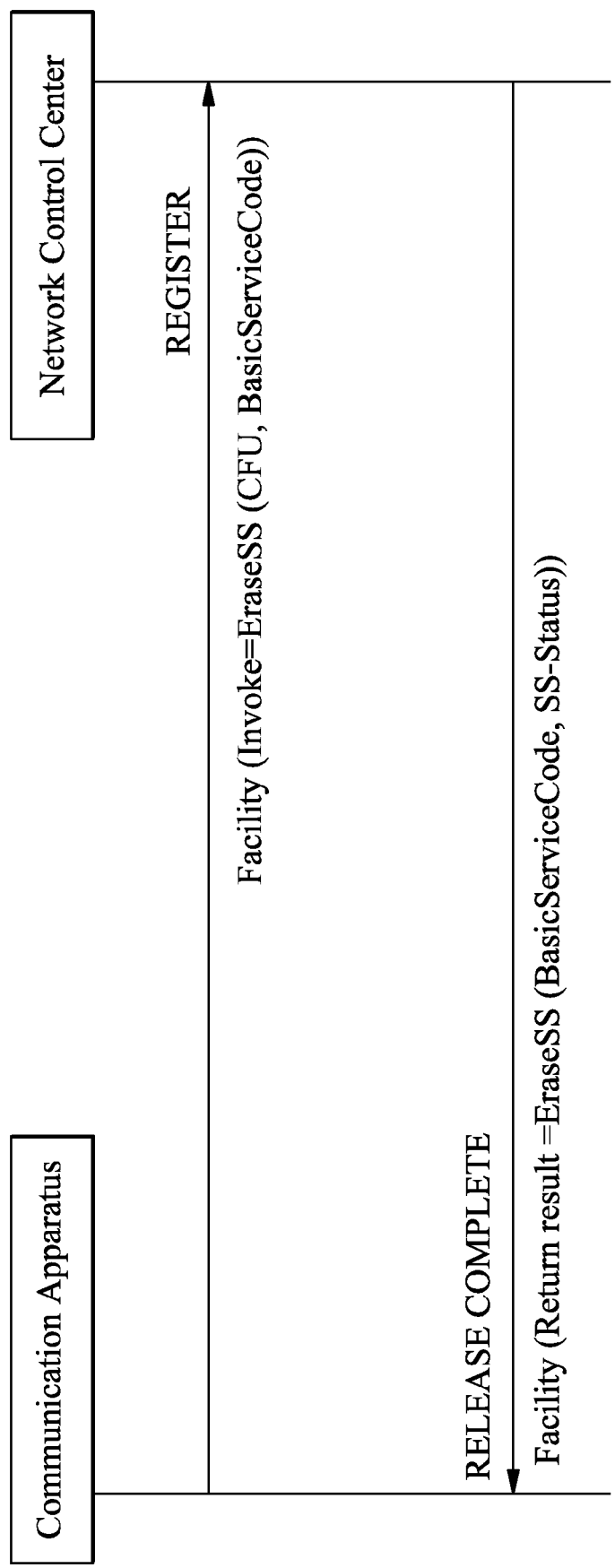
FIG. 11 shows an erasing registered CFU service procedure initialized by the communication apparatus according to an embodiment of the invention.
Figure 12:
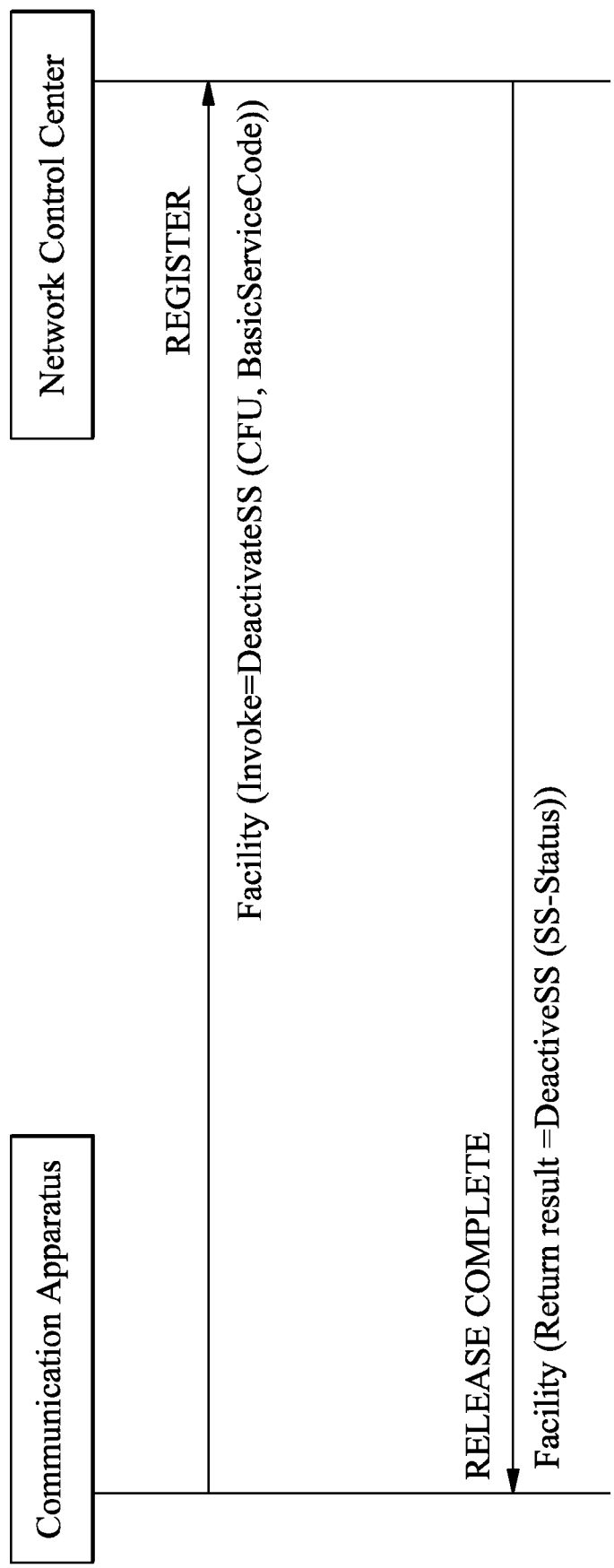
FIG. 12 shows an explicit CFU deactivation procedure initialized by the communication apparatus according to an embodiment of the invention.

FIG. 9 shows the CFU registration procedure initialized by the communication apparatus 100 according to an embodiment of the invention. As shown in FIG. 9, the CFU registration request transmitted by the communication apparatus 100 includes an SS-Code (Supplementary Service-Code) of the forwarding service to be registered and possibly the BasicServiceCode in which the request applies to. If the BasicServiceCode is not included, the request applies to all basic services. If the registration is successful, the CFU service is registered and activated. The network control center, such as an MSC, subsequently sends a return result indicating acceptance of the request including the ForwardedToNumber and possibly the BasicService (group) Code to which the CFU service is registered. FIG. 10 shows an explicit CFU activation procedure initialized by the communication apparatus 100 according to an embodiment of the invention. An explicit CFU activation request transmitted by the communication apparatus 100 contains the supplementary service to be activated and possibly the basic service group in which the request applies to. If a basic service group is not included in the activation request the request applies to all basic services against which a CFU forwarded-to number is registered. FIG. 11 shows a CFU service erasing procedure initialized by the communication apparatus 100 according to an embodiment of the invention. When the erasure is successful, the CFU service will be erased (and automatically deactivated). The network control center then sends a return result indicating acceptance of the request. The result may include the BasicService (group) Code for which the CFU was erased and an SS-Status (Supplementary Service-Status) parameter. If the request does not include a BasicServiceCode, the erasure was successful for all basic services. FIG. 12 shows an explicit CFU deactivation procedure initialized by the communication apparatus 100 according to an embodiment of the invention. As shown in to FIG. 12, an explicit CFU deactivation request contains the supplementary service to be deactivated and possibly the basic service group in which the request applies to. If a basic group is not included in the deactivation request, the request applies to all basic services against which the CFU is activated. The communication apparatus 100 receive notification acceptance of the CFU deactivation request.

Figure 13:
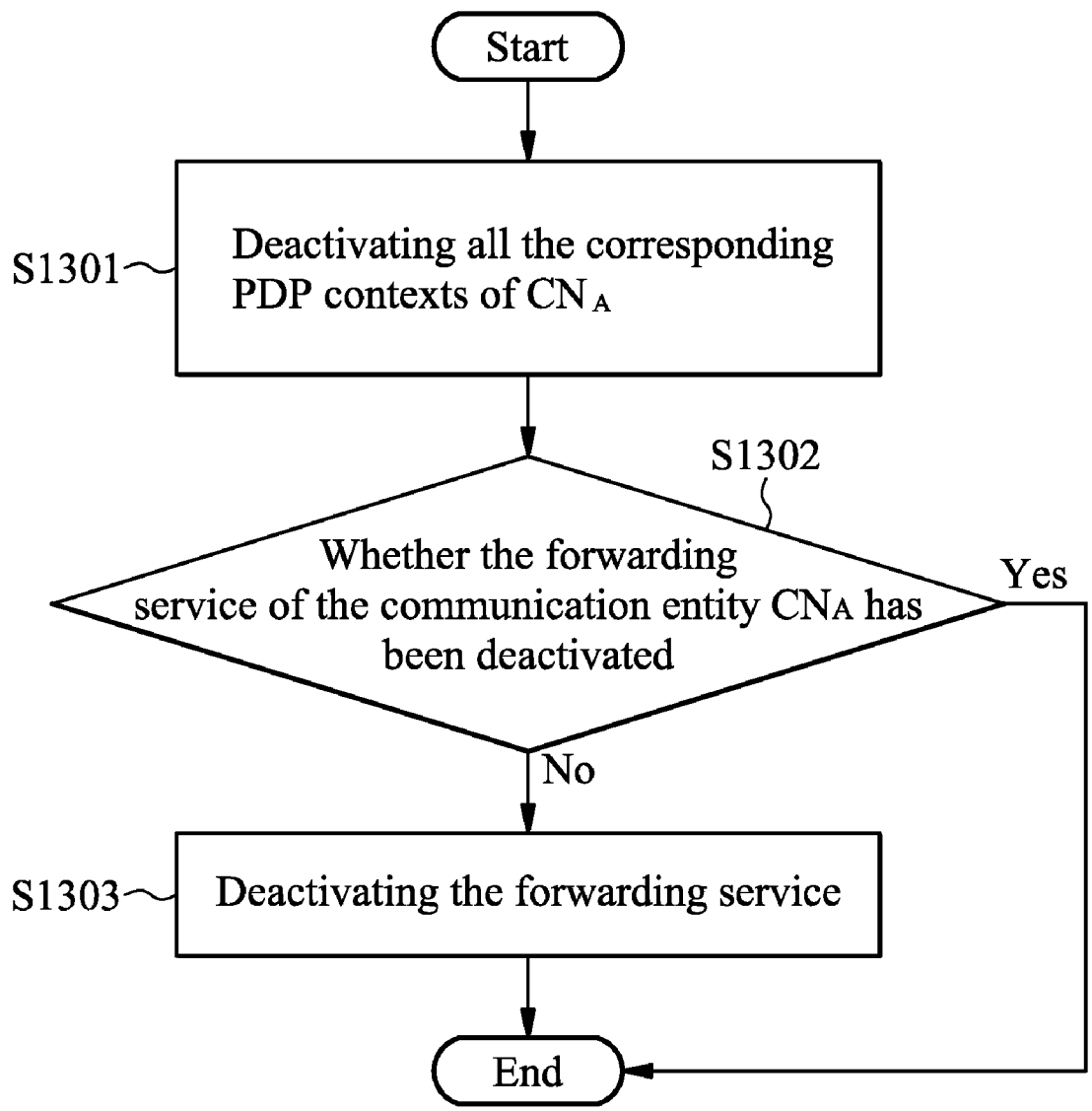
FIG. 13 shows a flow chart of the method for deactivating the forwarding service according to an embodiment of the invention.

According to an embodiment of the invention, the forwarding service may be recovered when the user finishes the use of the GPRS service. FIG. 13 shows a flow chart of the method for deactivating the forwarding service according to an embodiment of the invention. When a user plans to finish the use of the GPRS service corresponding to $CN_A$, the processor may receive a corresponding message from the MMI to indicate to deactivate the PDP context. Next, the processor transmits a deactivate PDP context request from $CN_A$ to $Cell_A$ to deactivate all of the corresponding PDP contexts (Step S1301). Next, the processor determines whether the forwarding service, which forwards the apparatus terminated communication request of $CN_A$ to $CN_B$, has been deactivated (Step S1302). When the forwarding service has not been deactivated, the processor further transmits a transfer deactivation request from $CN_A$ to $Cell_A$ to deactivate the forwarding service (Step S1303). According to the embodiment of the invention, the transfer deactivation request may be a CFU deactivation request as previously described to deactivate the corresponding CFU supplementary service.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus, comprising:
a first radio transceiver module;
a second radio transceiver module;
a first subscriber identity card with a first address camping on a first cell belonging to a first wireless network via the first radio transceiver module;
a second subscriber identity card with a second address camping on a second cell belonging to a second wireless network via the second radio transceiver module; and
a processor coupled to the first radio transceiver module, the second radio transceiver module, the first subscriber identity card and the second subscriber identity card, determining whether a first communication status of the first subscriber identity card has reached a first limitation, determining whether a second communication status of the second subscriber identity card has reached a second limitation, and determining whether to activate a service instructing the first wireless network to transfer a first apparatus terminated communication request of the first subscriber identity card to the second subscriber identity card according to determination results for the first communication status and the second communication status, wherein the first apparatus terminated communication request is initiated from a peer communication entity to request for establishing wireless communication with the first subscriber identity card.

2. The communication apparatus as claimed in claim 1, wherein the first communication status indicates a total number of active and held calls currently maintained by the first subscriber identity card, the first limitation indicates a total number of active and held calls which can be supported by the first wireless network, the second communication status indicates a total number of active and held calls currently maintained by the second subscriber identity card, and the second limitation indicates a total number of active and held calls which can be supported by the second wireless network.

3. The communication apparatus as claimed in claim 2, wherein, when the first communication status reaches the first limitation and the second communication status does not reach the second limitation, the processor further transmits a transfer request from the first subscriber identity card to the first cell to request the first wireless network to transfer the first apparatus terminated communication request of the first subscriber identity card to the second subscriber identity card.

4. The communication apparatus as claimed in claim 3, wherein, after receiving the first apparatus terminated communication request, the processor further determines whether the first communication status reaches the first limitation and whether the second communication status reaches the second limitation, and transmits the transfer request after receiving an answer indication message to indicate acceptance of the first apparatus terminated communication request.

5. The communication apparatus as claimed in claim 3, wherein the transfer request is a call deflection supplementary service request with the second address so as to deflect the first apparatus terminated communication request to the second subscriber identity card.

6. The communication apparatus as claimed in claim 3, wherein the processor further receives a release message indicating termination of procedures of establishing the wireless communication from the first cell, receives a second apparatus terminated communication request of the second subscriber identity card from the second cell, and establishes the wireless communication with the peer communication entity through the second cell.

7. The communication apparatus as claimed in claim 1, wherein when the first communication status does not reach the first limitation, the processor establishes the wireless communication with the peer communication entity through the first cell after receiving an answer indication message to indicate acceptance of the first apparatus terminated communication request.

8. The communication apparatus as claimed in claim 1, wherein when the first communication status and the second communication status respectively have reached the first limitation and the second limitation, the processor transmits a reject request from the first subscriber identity card to the first cell to reject the first apparatus terminated communication request.

9. The communication apparatus as claimed in claim 1, wherein the first communication status indicates the current status of a forwarding service corresponding to the first subscriber identity card, the first limitation indicates that no forwarding service corresponding to the first subscriber identity card has been activated, the second communication status indicates the current status of a packet data protocol (PDP) context corresponding to the second subscriber identity card, and the second limitation indicates that an PDP context has been activated.

10. The communication apparatus as claimed in claim 9, wherein, when the first communication status reaches the first limitation and the second communication status does not reach the second limitation, the processor transmits a transfer request from the first subscriber identity card to the first cell to request the first wireless network to activate a forwarding service to transfer at least one apparatus terminated communication request of the first subscriber identity card to the second subscriber identity card.

11. The communication apparatus as claimed in claim 10, wherein the forwarding service is a call forwarding related supplementary service with the second address so as to forward the apparatus terminated communication request to the second subscriber identity card, and the transfer request is an activate call forwarding supplementary service request to request for activating the call forwarding related supplementary service.

12. The communication apparatus as claimed in claim 10, wherein the processor further transmits at least one deactivate PDP context request from the first subscriber identity card to the first cell to deactivate all PDP contexts corresponding to the first subscriber identity card, and transmits a deactivate transfer request from the first subscriber identity card to the first cell to deactivate the forwarding service after all PDP contexts have been deactivated.

13. The communication apparatus as claimed in claim 1, wherein at least one of the first subscriber identity card and the second subscriber identity card is a subscriber identity module (SIM) card corresponding to the global system for mobile communications (GSM) communication system, a universal subscriber identity module (USIM) card corresponding to the universal mobile telecommunications system (UMTS) communication system, or a removable user identity module (RUIM) card or a CDMA subscriber identity module (CSIM) card corresponding to the code division multiple access (CDMA) 2000 communication system.

14. A method for handling an apparatus terminated communication request in a communication apparatus, wherein the communication apparatus comprises a first radio transceiver module, a second radio transceiver module, a first subscriber identity card with a first address camping on a first cell belonging to a first wireless network via the first radio transceiver module, a second subscriber identity card with a second address camping on a second cell belonging to a second wireless network via the second radio transceiver module, and a processor coupled to the first radio transceiver module, the second radio transceiver module, the first subscriber identity card and the second subscriber identity card for controlling the operations thereof, comprising:
  determining whether a first communication status of the first subscriber identity card reaches a first limitation;
  determining whether a second communication status of the second subscriber identity card reaches a second limitation; and
  when the first communication status reaches the first limitation and the second communication status does not reach the second limitation, transmitting a transfer request from the first subscriber identity card to the first cell to request the first wireless network to transfer a first apparatus terminated communication request of the first subscriber identity card to the second subscriber identity card,
  wherein the first apparatus terminated communication request is initiated from a peer communication entity to request for establishing wireless communication with the first subscriber identity card.

15. The method as claimed in claim 14, wherein the first communication status indicates a total number of active and held calls currently maintained by the first subscriber identity card, the first limitation indicates a total number of active and held calls which can be supported by the first wireless network, the second communication status indicates a total number of active and held calls currently maintained by the second subscriber identity card, and the second limitation indicates a total number of active and held calls which can be supported by the second wireless network.

16. The method as claimed in claim 14, further comprising:
  receiving an answer indication message to indicate acceptance of the first apparatus terminated communication request; and
  transmitting the transfer request after receiving the answer indication message.

17. The method as claimed in claim 14, wherein the transfer request is a call deflection supplementary service request with the second address so as to deflect the first apparatus terminated communication request to the second subscriber identity card.

18. The method as claimed in claim 14, wherein the first communication status indicates the current status of a forwarding service corresponding to the first subscriber identity card, the first limitation indicates that no forwarding service corresponding to the first subscriber identity card has been activated, the second communication status indicates the current status of a packet data protocol (PDP) context corresponding to the second subscriber identity card, and the second limitation indicates that an PDP context has been activated.

19. The method as claimed in claim 18, further comprising:
  registering and activating a PDP context corresponding to the first subscriber identity card; and
  transmitting the transfer request when the PDP context corresponding to the first subscriber identity card has been successfully registered and activated.

20. The method as claimed in claim 19, further comprising:
  transmitting a deactivate PDP context request from the first subscriber identity card to the first cell to deactivate the PDP context corresponding to the first subscriber identity card; and
  transmitting a deactivate transfer request from the first subscriber identity card to the first cell to deactivate the forwarding service after all the PDP context corresponding to the first subscriber identity card has been deactivated.

* * * * *